(12) United States Patent
Zhang et al.

(10) Patent No.: US 12,049,536 B2
(45) Date of Patent: Jul. 30, 2024

(54) TRIS (HYDROXYMETHYL) PHOSPHINE OXIDE BASED POLYESTER POLYOL AND A RESIN COMPOSITION OBTAINED THEREFROM

(71) Applicant: Huntsman International LLC, The Woodlands, TX (US)

(72) Inventors: Zhenghe Zhang, Shanghai (CN); Fan Xie, Shanghai (CN); Hualiang Zhong, Shanghai (CN); Yuefan Zhang, Shanghai (CN)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 17/639,453

(22) PCT Filed: Sep. 2, 2020

(86) PCT No.: PCT/EP2020/074472
§ 371 (c)(1),
(2) Date: Mar. 1, 2022

(87) PCT Pub. No.: WO2021/047977
PCT Pub. Date: Mar. 18, 2021

(65) Prior Publication Data
US 2022/0356294 A1    Nov. 10, 2022

(30) Foreign Application Priority Data
Sep. 12, 2019  (WO) ............... PCT/CN2019/105705

(51) Int. Cl.
| C07F 9/09 | (2006.01) |
| C08G 18/18 | (2006.01) |
| C08G 18/46 | (2006.01) |
| C08G 18/76 | (2006.01) |

(52) U.S. Cl.
CPC .......... *C08G 18/4684* (2013.01); *C07F 9/091* (2013.01); *C08G 18/7664* (2013.01); *C08G 2110/0025* (2021.01)

(58) Field of Classification Search
None
See application file for complete search history.

(56) References Cited

U.S. PATENT DOCUMENTS
| 3,925,265 A | 12/1975 | Lin |
| 2010/0197887 A1 | 8/2010 | Takasawa et al. |

FOREIGN PATENT DOCUMENTS
| CN | 101747371 A | | 6/2010 |
| CN | 106366302 A | * | 2/2017 |
| CN | 106700012 A | | 5/2017 |
| GB | 925570 A | | 5/1963 |

OTHER PUBLICATIONS

Machine translation of CN-106366302-A obtained from the European Patent Office in Jun. 2023 (Year: 2023).*
International Search Report and Written Opinion received in corresponding PCT Application PCT/EP2020/074472 completed Dec. 1, 2020 and mailed Dec. 9, 2020.

* cited by examiner

*Primary Examiner* — Melissa A Rioja
(74) *Attorney, Agent, or Firm* — HUNTSMAN INTERNATIONAL LLC LEGAL DEPARTMENT; Lewis Craft

(57) ABSTRACT

This disclosure generally provides tris (hydroxymethyl) phosphine oxide based polyfunctional polyester polyol compounds and resin compositions made therefrom which have improved flammability, wherein the resin composition comprising: (a) a polyfunctional isocyanate; (b) an isocyanate reactive composition comprising (b1) a polyfunctional polyol composition and a catalyst composition; and optionally (b2) a polyfunctional amine; wherein the polyfunctional polyol composition comprises tris (hydroxymethyl) phosphine oxide based polyfunctional polyester polyol compound.

14 Claims, 1 Drawing Sheet

Example 1    2    3    4

Example 5    6    7    8

TRIS (HYDROXYMETHYL) PHOSPHINE OXIDE BASED POLYESTER POLYOL AND A RESIN COMPOSITION OBTAINED THEREFROM

CROSS-REFERENCE TO RELATED APPLICATIONS

This application is the National Phase of International Application PCT/EP2020/074472 filed Sep. 2, 2020 which claims priority to PCT/CN2019/105705 filed Sep. 12, 2019. The noted applications are incorporated herein by reference.

FIELD OF THE INVENTION

This invention relates generally to tris (hydroxymethyl) phosphine oxide based polyester polyols and resin compositions obtained therefrom, and more specially to polyurethane resin compositions used in polyurethane foams.

BACKGROUND INFORMATION

Polyurethane (PU) and tris (hydroxymethyl) phosphine oxide (THPO) mixture are already known in the art.

CN101747371 discloses a THPO based polyol. But the polyol is prepared by mono-functional acid which would result in less stable mechanical property of the PU foam made therefrom.

U.S. Pat. No. 3,925,265 discloses the use of THPO to improve heat-resistant performance of PU. But the polyol is different and the mixture may have poor miscibility with other polyols.

CN106700012 discloses using THPO to prepare rigid PU foam. But the polyol is polyether polyol. PU foam made therefrom has poor mechanical property.

However, known solutions are not able to provide a polyfunctional polyol compound with good miscibility with other polyols and give improved flammability resistance to PU composition made therefrom.

SUMMARY OF THE INVENTION

It has now been surprisingly found that the compounds and compositions of the present disclosure address the above problem. Advantages of the present disclosure may include: (1) good miscibility; (2) improved flammability resistance; and (3) no obvious influence on the mechanical properties of the foam.

The present disclosure is concerned with compounds with good miscibility with polyols, compositions with improved flammability resistance and processes for preparing these compositions. In one embodiment, the disclosure provides a tris (hydroxymethyl) phosphine oxide based polyfunctional polyester polyol compound having the formula:

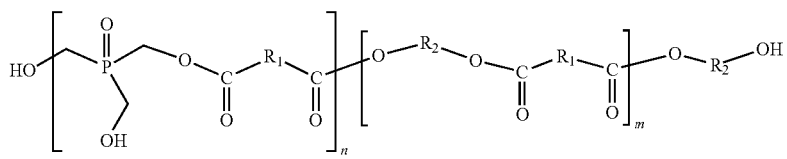

(I)

wherein
each $R_1$ and $R_2$ are independently of one another selected from a combination of linear, branched, saturated, unsaturated, cyclic and/or non-cyclic carbon chains, aliphatic hydrocarbons, araliphatic hydrocarbons, aromatic hydrocarbons and mixtures thereof, optionally interrupted by one or more oxygen atoms, nitrogen atoms and/or sulphur atoms, and optionally comprising any functional group selected from hydroxy, ether, halogen, carbonyl, carboxyl, urethane, nitro and/or amine groups;

n is in a range of from 1 to 25, more preferred from 1 to 5;

m is in a range of from 0 to 25, more preferred from 1 to 5;

In another embodiment, the present disclosure provides a use of the tris (hydroxymethyl) phosphine oxide based polyfunctional polyester compound to form a resin composition.

In yet another embodiment, the present disclosure provides a resin composition comprising:
(a) a polyfunctional isocyanate; and
(b) an isocyanate reactive composition comprising
(b1) a polyfunctional polyol composition and a catalyst composition; and/or
(b2) a polyfunctional amine;
wherein the polyfunctional polyol composition comprises the tris (hydroxymethyl) phosphine oxide based polyfunctional polyester polyol compound of the present disclosure.

In still another embodiment, the present disclosure provides a process for making the resin composition, comprising adding isocyanate reactive composition to a polyfunctional isocyanate, wherein the isocyanate reactive composition comprising
a polyfunctional polyol composition and a catalyst composition; and optionally
a polyfunctional amine;
wherein the polyfunctional polyol composition comprises the tris (hydroxymethyl) phosphine oxide based polyfunctional polyester polyol compound.

In still another embodiment, the present disclosure provides a use of the resin compositions to form a rigid foam product.

In still another embodiment, the present disclosure provides a rigid foam product comprises the resin composition.

DETAILED DESCRIPTION

Figure 1:
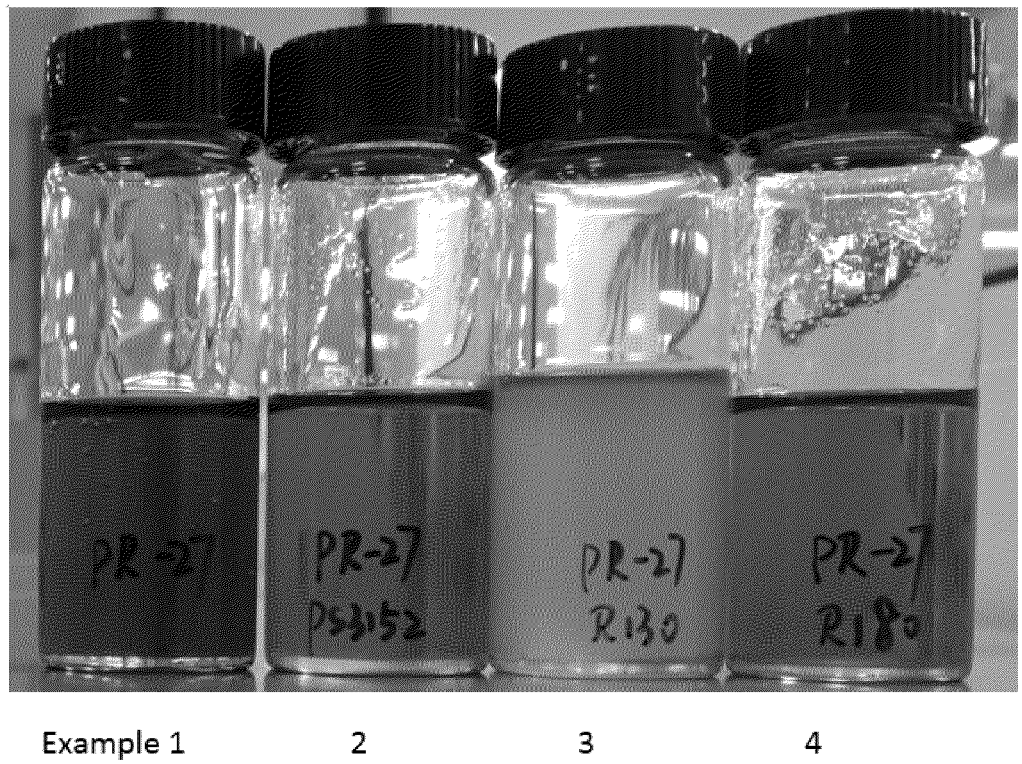
FIG. 1 demonstrates that the polyol of the current disclosure and normal polyols are miscible with each other (Example 2-4). However, it is shown in FIG. 2 that THPO and normal polyols are immiscible with each other (Example 6-7).

If appearing herein, the term "comprising" and derivatives thereof are not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability and the term "consisting of", if used, excludes any component, step or procedure not specifically delineated or listed. The term "or", unless stated otherwise, refers to the listed members individually as well as in any combination.

The articles "a" and "an" are used herein to refer to one or to more than one (i.e. to at least one) of the grammatical object of the article. By way of example, "a resin" means one resin or more than one resin.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The present disclosure generally provides a tris (hydroxymethyl) phosphine oxide based polyfunctional polyester polyol compound having the formula:

any functional group selected from hydroxy, ether, halogen, carbonyl, carboxyl, urethane, nitro and/or amine groups;

n is in a range of from 1 to 25, more preferred from 1 to 5;

m is in a range of from 0 to 25, more preferred from 1 to 5;

According to one embodiment, n is in a range of from 1 to 3.

According to another embodiment, m is in a range of from 1 to 3.

According to still another embodiment, $R_1$ is independently an alkyl group.

Examples of alkyl groups are methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl and octadecyl groups.

According to a preferred embodiment, $R_2$ is independently selected from an alkoxy group and a hydrogenated triazine group and its derivatives as recited in formula (III) below, wherein the alkoxy group is $(CH_2CHCH_3O)_x$—$(CH_2CH_2O)_y$, x is in a range of from 0 to 70, more preferred from 0 to 20, and y is in a range of from 0 to 70, more preferred from 1 to 20, subject to the proviso that the sum of x and y is greater than or equal to 1.

The molecular weight of polyfunctional polyol compounds may be in an amount ranging from about 100 to about 1500, preferably from about 500 to about 1000.

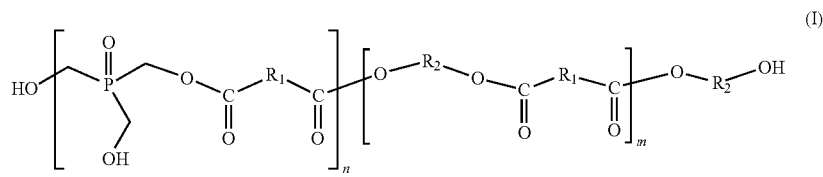

(I)

wherein each $R_1$ and $R_2$ are independently of one another selected from a combination of linear, branched, saturated, unsaturated, cyclic and/or non-cyclic carbon chains, aliphatic hydrocarbons, araliphatic hydrocarbons, aromatic hydrocarbons and mixtures thereof, optionally interrupted by one or more oxygen atoms, nitrogen atoms and/or sulphur atoms, and optionally comprising Molecular weight (MW) is weight average molecular weight which is defined by Gel Permeation Chromatography (GPC) method with polystyrene as a reference.

The tris (hydroxymethyl) phosphine oxide based polyfunctional polyester polyol compound of the present disclosure can be made by reacting THPO, one or more polyfunctional polyols and one or more acid in a solvent.

In a more preferred embodiment, the tris (hydroxymethyl) phosphine oxide based polyfunctional polyester polyol compound has a structure of formula (II) or formula (III).

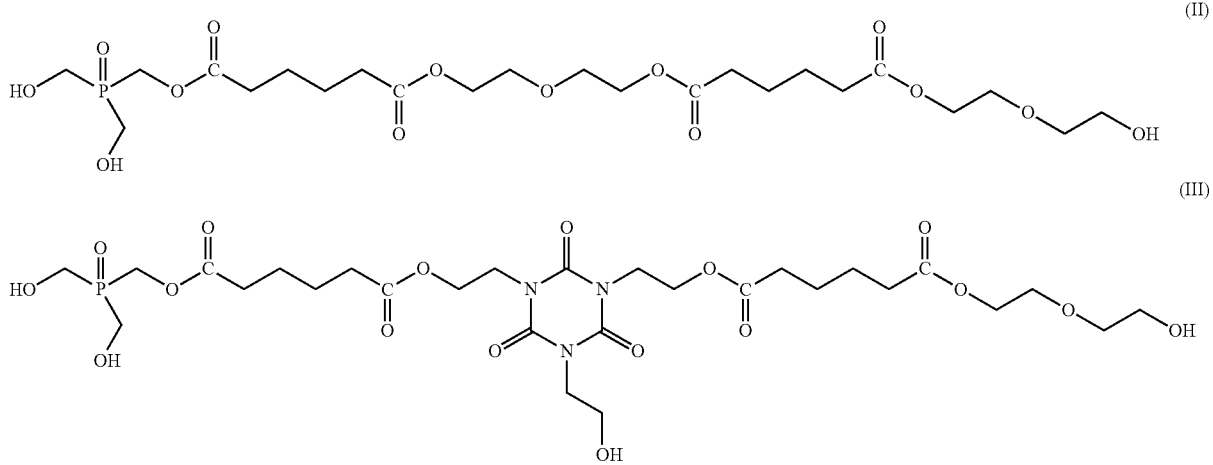

Advantages of the disclosed compound may include: (1) good miscibility; (2) improved flammability resistance; and (3) no obvious influence on the mechanical properties of the foam when it is added to a foam composition.

The present disclosure also provides a use of the tris (hydroxymethyl) phosphine oxide based polyfunctional polyester polyol compound of the present disclosure to form a resin composition.

The present disclosure also provides a resin composition comprising:
(a) a polyfunctional isocyanate; and
(b) an isocyanate reactive composition comprising
    (b1) a polyfunctional polyol composition and a catalyst composition; and optionally
    (b2) a polyfunctional amine;
wherein the polyfunctional polyol composition comprises the tris (hydroxymethyl) phosphine oxide based polyfunctional polyester polyol compound of the present disclosure.

According to one embodiment, the polyfunctional isocyanate includes those represented by the formula $Q(NCO)_n$ where n is a number from 2-5, preferably 2-3 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms, wherein aromatic hydrocarbon groups are in general preferred.

Examples of polyfunctional isocyanates include, but are not limited to, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; isophorone diisocyanate; 2,4- and 2,6-hexahydrotoluene diisocyanate and mixtures of these isomers; dicyclohexylmethane-4,4'-diisocyanate (hydrogenated MDI or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4''-triisocyanate; mixture of oligomeric polymethylene-polyisocyanates (polymeric MDI); norbornane diisocyanates; m- and p-isocyanatophenyl sulfonylisocyanates; perchlorinated aryl polyisocyanates; modified polyfunctional isocyanates containing carbodiimide groups, urethane groups, allophonate groups, isocyanurate groups, urea groups, or biuret groups; polyfunctional isocyanates obtained by telomerization reactions; polyfunctional isocyanates containing ether groups; and polyfunctional isocyanates containing polymeric fatty acid groups. Those skilled in the art will recognize that it is also possible to use mixtures of the polyfunctional isocyanates described above, preferably using mixture of polymeric MDI, mixture of MDI isomers and mixture of TDI.

In another embodiment, prepolymers of MDI or TDI can also be used as an alternative of MDI or TDI. Prepolymers of MDI or TDI are prepared by the reaction of an excess of above mentioned polyfunctional isocyanates (such as an MDI or TDI) and a polyfunctional polyol. The prepolymer preferably has an NCO value of 20-35% by weight. The synthesis processes of prepolymers of MDI or TDI are known in the art (see for example Polyurethanes Handbook $2^{nd}$ edition, G. Oertel, 1994).

The isocyanate reactive composition suitable for use in the present disclosure may include polyfunctional polyol composition and catalyst composition, and optionally polyfunctional amine.

The polyfunctional polyol composition comprises the tris (hydroxymethyl) phosphine oxide based polyfunctional polyester polyol compound of formula (I).

The polyfunctional polyol composition may also comprise other polyfunctional polyols.

The other polyfunctional polyols for use in the present disclosure may include, but are not limited to, polyether polyols, polyester polyols, biorenewable polyols, polymer polyols, a non-flammable polyol such as a phosphorus-containing polyol or a halogen-containing polyol. Such polyols may be used alone or in suitable combination as a mixture.

General functionality of polyfunctional polyols used in the present disclosure is from 2 to 8. The molecular weight of polyols may be in an amount ranging from 100 to 1500, preferably from 500 to 1000.

The proportion of said polyfunctional polyol composition is generally in an amount ranging from 10% to 80% by weight, preferably from 15% to 60% based on the resin composition. Polyether polyols for use in the present disclosure include alkylene oxide polyether polyols such as ethylene oxide polyether polyols and propylene oxide polyether polyols and copolymers of ethylene and propylene oxide with terminal hydroxyl groups derived from and polyhydric compounds, including diols and triols; for example, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, sucrose, sorbitol and similar low molecular weight polyols.

Polyester polyols for use in the present disclosure include, but are not limited to, those produced by reacting a dicarboxylic acid with an excess of a diol, for example, adipic acid with ethylene glycol or butanediol, or reaction of a lactone with an excess of a diol such as caprolactone with propylene glycol. In addition, polyester polyols for use in the present disclosure may also include: linear or slightly branched aliphatic (mainly adipates) polyols with terminal hydroxyl group; low molecular weight aromatic polyesters; polycaprolactones; polycarbonate polyol. Those linear or slightly branched aliphatic (mainly adipates) polyols with terminal hydroxyl group are produced by reacting a dicarboxyl acids with an excess of diols, triols and their mixture; those dicarboxyl acids include, but are not limited to, for example, adipic acid, AGS (adipic glutaric succinic) mixed acid; those diols, triols include, but are not limited to, for example, ethylene glycol, diethylene glycol, propylene glycol, dipropylene glycol, 1,4-butane diol, 1,6-hexane diol, glycerol, trimethylolpropane and pentaerythritol. Those low molecular weight aromatic polyesters include products derived from the process residues of dimethyl terephalate (DMT) production, commonly referred to as DMT still bottoms, products derived from the glycolysis of recycled poly(ethyleneterephthalate) (PET) bottles or magnetic tape with subsequent re-esterification with di-acids or reaction with alkylene oxides, and products derived by the directed esterification of phthalic anhydride. Polycaprolactones are produced by the ring opening of caprolactones in the presence of an initiator and catalyst. The initiator includes ethylene glycol, diethylene glycol, propylene glycol, dipropylene glycol, 1,4-butane diol, 1,6-hexane diol, glycerol, trimethylolpropane and pentaerythritol. Polycarbonate polyols are derived from carbonic acid—that can be produced through the polycondensation of diols with phosgene, although transesterification of diols, commonly hexane diol, with a carbonic acid ester, such as diphenylcarbonate.

Biorenewable polyols suitable for use in the present disclosure include castor oil, sunflower oil, palm kernel oil, palm oil, canola oil, rapeseed oil, soybean oil, corn oil, peanut oil, olive oil, algae oil, and mixtures thereof.

Examples of polyfunctional polyols also include, but are not limited to, graft polyols or polyurea modified polyols. Graft polyols comprise a triol in which vinyl monomers are graft copolymerized. Suitable vinyl monomers include, for example, styrene, or acrylonitrile. A polyurea modified polyol, is a polyol containing a polyurea dispersion formed by the reaction of a diamine and a diisocyanate in the presence of a polyol. A variant of polyurea modified polyols are polyisocyanate poly addition (PIPA) polyols, which are formed by the in situ reaction of an isocyanate and an alkanolamine in a polyol.

The non-flammable polyol may, for example, be a phosphorus-containing polyol obtainable by adding an alkylene oxide to a phosphoric acid compound. A halogen-containing polyol may, for example, be those obtainable by ring-opening polymerization of epichlorohydrine or trichlorobutylene oxide.

The polyfunctional amine for use in the present disclosure may include polyether polyamine or polyester polyamine.

In a preferred embodiment, the polyfunctional polyol composition comprises tris (hydroxymethyl) phosphine oxide based polyfunctional polyester polyol compound of formula (II) or (III) and polyether polyol.

In the present disclosure, the isocyanate reactive composition further includes one or more catalysts in order to catalyse the reaction between polyfunctional isocyanate and polyfunctional polyol, for example, amine catalyst such as N,N-dimethylethanolamine, N,N-dimethyl-N',N'-di(2-hydroxypropyl)-1,3-propanediamine, 2-((2-(2-(dimethylamino)ethoxy)ethyl) methylamino)ethanol, dimethylcyclohexylamine (DMCHA) and triethylene diamine; and trimerization catalyst such as tertiary amines, triazines and most preferably metal salt trimerization catalysts.

Two or more different catalysts can be used in the process of the present disclosure.

In one embodiment, the proportion of the catalysts present in the composition is in an amount ranging from 0.001 to 10 wt %, preferably from 0.1 to 5 wt % based on the total weight of the resin composition.

According to one embodiment, the NCO index of the resin composition is in the range of from 0.7 to 5, preferably from 1 to 5, and more preferably from 1.2 to 4.

The isocyanate index or NCO index or index is the ratio of NCO-groups over isocyanate-reactive hydrogen atoms present in a formulation.

$$NCO/\text{active hydrogen}$$

In other words, the NCO-index expresses the amount of isocyanate actually used in a formulation with respect to the amount of isocyanate theoretically required for reacting with the amount of isocyanate-reactive hydrogen used in a formulation.

In another embodiment, the resin composition may further optionally comprise fire retardants, antioxidants, solvents, surfactants, physical or chemical blowing agents, chain extender, crosslinking agent, foam stabilizer, fillers, pigments, or any other typical additives used in PU materials.

The present disclosure also provides a process for making the resin composition, comprising adding isocyanate reactive composition to a polyfunctional isocyanate, wherein the isocyanate reactive composition comprising a polyfunctional polyol composition and a catalyst composition; and optionally a polyfunctional amine;

wherein the polyfunctional polyol composition comprises the tris (hydroxymethyl) phosphine oxide based polyfunctional polyester polyol compound.

Furthermore, the present disclosure also provides the use of the resin compositions to form a rigid foam product, such as insulation layer in the roof, wall or refrigeration.

The present disclosure also provides a rigid foam product comprises the resin composition of the present disclosure.

The examples which now follow should be considered exemplary of the present disclosure, and not delimitive thereof in any way.

Raw Materials

Polyfunctional Isocyanate: SUPRASEC® 5005 polymeric MDI (Supplier: Huntsman Corporation, USA);

PS3152: STEPANPOL® PS-3152 difunctional polyester polyol; has a molecular weight around 356 (Supplier: Stepan Company, USA);

R130: DALTOLAC® R 130 polyether polyol; has a molecular weight around 680 (Supplier: Huntsman Corporation, USA);

R180: DALTOLAC® R 180 polyether polyol; has a molecular weight around 560 (Supplier: Huntsman Corporation, USA);

NJ-8238: sucrose-based polyether polyol; has a molecular weight around 830 (Supplier: Jurong Ningwu New Material, China);

THPO: tris (hydroxymethyl) phosphine oxide;

THEIC: 1,3,5-tris(2-hydroxyethyl)cyanuric acid (Supplier: Yangzhou Sandeli Chemical, China);

Surfactant: TEGOSTAB® B8462 polymer additive (silicone surfactant). (Supplier: Evonik, Germany);

Catalyst: N,N-dimethylcyclohexylamine (DMCHA);

Foaming Agent: 1,1-dichloro-1-fluoroethane

Preparing of Polyester Polyol PR-27 and PR-29

PR-27:

THPO, diethylene glycol and adipic acid were mixed in the proportion (by mole of molecules) of 1:2:2 to a 250 mL three-neck flask, equipped with mechanical stirrer, thermometer and reflux condenser at ambient temperature. After 10 mins, the temperature was raised to 160 Deg C., the mixture was stirred for another 16 hours. The reaction mixture was vacuumed under 160 Deg C. for about 2 hours until the acid value was less than 5 mg KOH/g to obtain a THPO based polyfunctional polyester polyol which has a structure of formula (II).

in Table 1 refer to parts by weight of the components. As shown in Table 1, Examples 1 and 5 were blank control examples that contained no normal polyol.

TABLE 1

| Formulation | Example | | | | | | | |
| --- | --- | --- | --- | --- | --- | --- | --- | --- |
| | 1 | 2 | 3 | 4 | 5 | 6 | 7 | 8 |
| PR-27 | 100 | 50 | 50 | 50 | | | | |
| PS3152 | | 50 | | | | 50 | | |
| R130 | | | 50 | | | | 50 | |
| R180 | | | | 50 | | | | 50 |
| THPO | | | | | 100 | 50 | 50 | 50 |

Procedure

All components, if necessary, were dried at 100° C. for 2~3 hours to have a water content of below 400 ppm. The

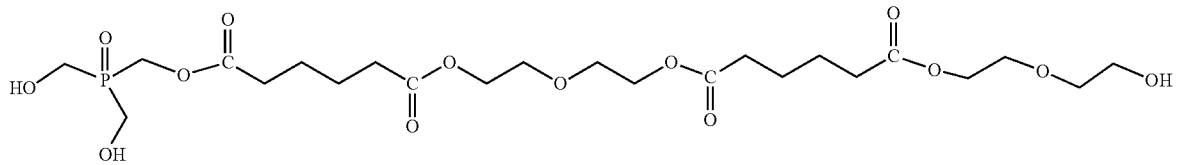

(II)

PR-29:

THPO, THEIC, diethylene glycol and adipic acid were mixed in the proportion (by mole of molecules) of 1:1:1:2 to a 250 mL three-neck flask, equipped with mechanical stirrer, thermometer and reflux condenser at ambient temperature. After 10 mins, the temperature was raised to 160 Deg C., the mixture was stirred for another 16 hours. The reaction mixture was vacuumed under 160 Deg C. for about 2 hours until the acid value was less than 5 mg KOH/g to obtain a THPO based polyfunctional polyester polyol which has a structure of formula (III).

components were mixed in the proportions indicated above and stirred in a closed cup for 2 hours to obtain a mixture. Let the mixture of each example stand for one month at room temperature (illustrated in FIG. 1).

Results

Miscibility Performance

Figure 2:
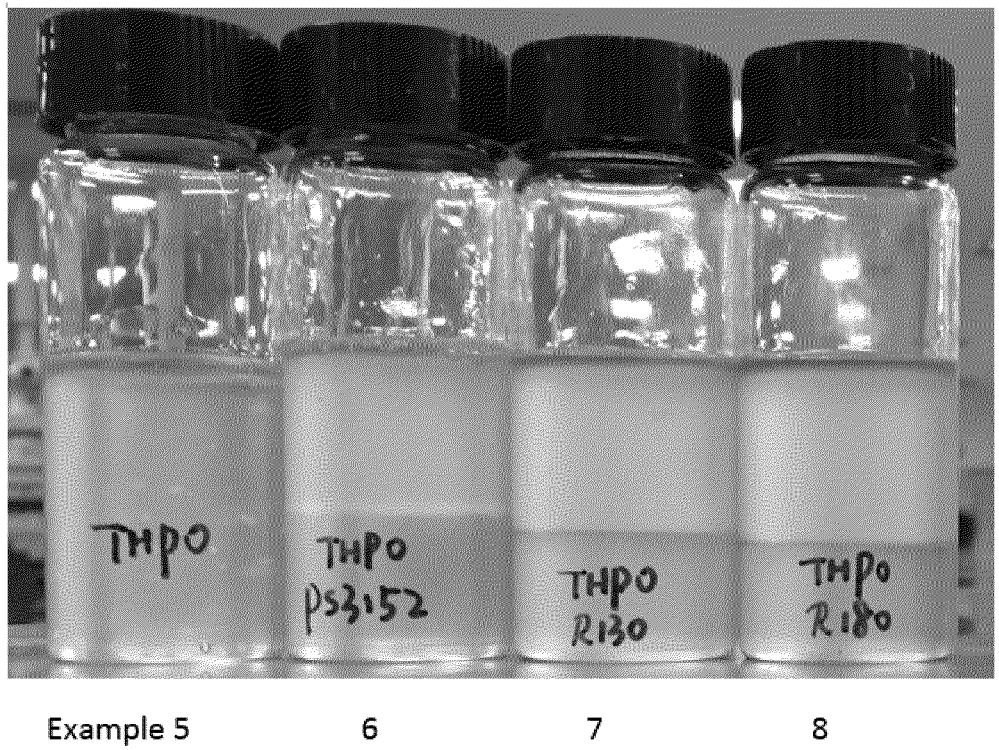

As demonstrated in FIG. 1, the polyol of the current disclosure which is THPO based polyol is miscible with normal polyols (Example 2-4). However, as shown in FIG. 2, THPO and normal polyols are immiscible with each other (Example 6-8).

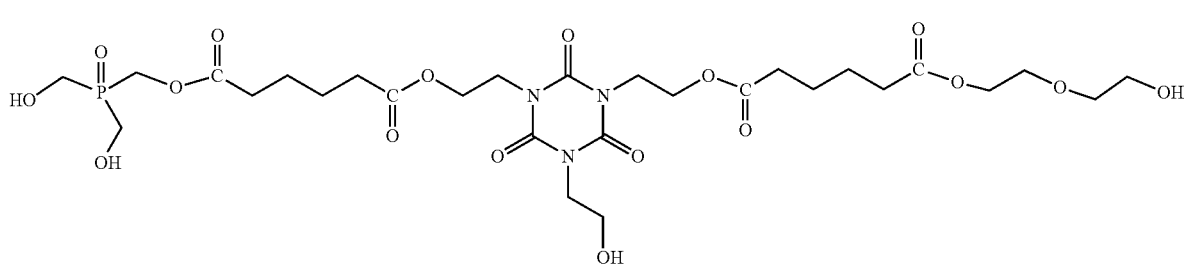

(III)

Examples 1-8

Examples 2-4 were produced by mixing normal polyol with the polyol of the current disclosure which is a THPO based polyol. Examples 6-8 were comparative examples that is a mixture of normal polyol and THPO. Components for Examples 1 through 8 are shown in Table 1. All values listed Examples 9-12

Examples 9-12 were produced with the Polyfunctional Isocyanate as the A Component. The B Components for Examples 9 through 12 are shown in Table 2. All values listed in Table 2 refer to parts by weight of the B Component. As shown in Table 2, Examples 12 was comparative example that contained no THPO based polyol.

TABLE 2

| B Component Formulation | Example | | | |
|---|---|---|---|---|
| | 9 | 10 | 11 | 12 |
| NJ-8238 | 42.9 | | | 85.8 |
| PR-27 | 42.9 | 85.8 | | |
| PR-29 | | | 85.8 | |
| Surfactant | 1.7 | 1.7 | 1.7 | 1.7 |
| Catalyst | 2.2 | 2.2 | 2.2 | 2.2 |
| Foaming Agent | 8.6 | 8.6 | 8.6 | 8.6 |
| water | 1.7 | 1.7 | 1.7 | 1.7 |

Procedure

For Examples 9-12, the A and B Components were mixed in the proportion (by weight) of A:B=1.2:1 and at an index of 1.2. The mixture of each example was stirred in a polyethylene container to make the polyurethane foam. The resulting foam composition was rapidly poured into polyethylene bag. The foaming reaction proceeded and the foam was allowed to free rise. The foams are cured for a minimum of 24 hours at room temperature before being tested. For each formulation about 1 kilogram (kg) foam was made via hand mix foam procedure for test.

Results

Flammability Resistance Performance and Physical Property

TABLE 3

| Example | 9 | 10 | 11 | 12 |
|---|---|---|---|---|
| Density [1] [g/L] | 45 | 45 | 45 | 45 |
| Limited oxygen index [2] [%] | 23.6 | 24.2 | 24.1 | 19.2 |

[1] Tested according to ISO 845
[2] Tested according to ASTM D2863-13

Table 3 shows the flammability resistance performance and physical property for Examples 9-12. When THPO based polyol is present (Examples 9 to 11), there is a significant improvement of flammability resistance and no obvious influence on the mechanical properties of the foam.

What is claimed is:

1. A tris (hydroxymethyl) phosphine oxide based polyfunctional polyester polyol compound having the formula (I):

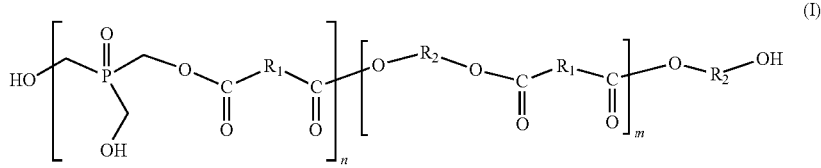

wherein
$R_1$ is selected from a combination of linear, branched, saturated, unsaturated, cyclic and/or non-cyclic carbon chains, aliphatic hydrocarbons, araliphatic hydrocarbons, aromatic hydrocarbons and combinations thereof, optionally interrupted by one or more oxygen atoms, nitrogen atoms and/or sulphur atoms, and optionally comprising any functional group selected from hydroxy, ether, halogen, carbonyl, and/or carboxyl groups and combinations thereof;
n is in a range of from 1 to 25;
m is in a range of from 0 to 25; and
$R_2$ is a hydrogenated triazine group or derivative thereof.

2. The tris (hydroxymethyl) phosphine oxide based polyfunctional polyester polyol compound of claim 1, wherein n is in a range of from 1 to 3.

3. The tris (hydroxymethyl) phosphine oxide based polyfunctional polyester polyol compound of claim 1, wherein m is in a range of from 1 to 3.

4. The tris (hydroxymethyl) phosphine oxide based polyfunctional polyester polyol compound of claim 1, wherein each $R_1$ is an alkyl group.

5. The tris (hydroxymethyl) phosphine oxide based polyfunctional polyester polyol compound of claim 1, wherein the molecular weight of the polyfunctional polyol is in an amount ranging from about 100 to about 1500.

6. A resin composition comprising:
(a) a polyfunctional isocyanate; and
(b) an isocyanate reactive composition comprising
(b1) a polyfunctional polyol composition and a catalyst composition; and optionally
(b2) a polyfunctional amine;
wherein the polyfunctional polyol composition comprises the tris (hydroxymethyl) phosphine oxide based polyfunctional polyester polyol compound of claim 1.

7. The resin composition of claim 6, wherein the resin composition has a NCO index in the range from about 0.7 to about 5.

8. The resin composition of claim 6, wherein the polyfunctional isocyanate is a polymeric MDI or an MDI isomer mixture or a mixture thereof.

9. The resin composition of claim 6, wherein the catalyst composition comprises an amine catalyst and/or a trimerization catalyst.

10. The resin composition of claim 6, wherein the polyfunctional amine (b2) is a polyetheramine.

11. A process for making a resin composition comprising adding an isocyanate reactive composition to a polyfunctional isocyanate, wherein the isocyanate reactive composition comprises:

a polyfunctional polyol composition and a catalyst composition; and optionally
a polyfunctional amine;
wherein the polyfunctional polyol composition comprises a tris (hydroxymethyl) phosphine oxide based polyfunctional polyester polyol compound having the formula (I):

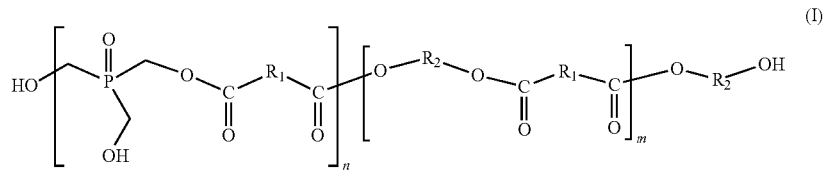

wherein
- R₁ is selected from a combination of linear, branched, saturated, unsaturated, cyclic and/or non-cyclic carbon chains, aliphatic hydrocarbons, araliphatic hydrocarbons, aromatic hydrocarbons and combinations thereof, optionally interrupted by one or more oxygen atoms, nitrogen atoms and/or sulphur atoms, and optionally comprising any functional group selected from hydroxy, ether, halogen, carbonyl, and/or carboxyl groups and combinations thereof;
- n is in a range of from 1 to 25; and
- m is in a range of from 0 to 25; and
- $R_2$ is a hydrogenated triazine group or derivative thereof.

12. A rigid foam product prepared from the resin composition of claim 6.

13. A tris (hydroxymethyl) phosphine oxide based polyfunctional polyester polyol compound having the formula (III):

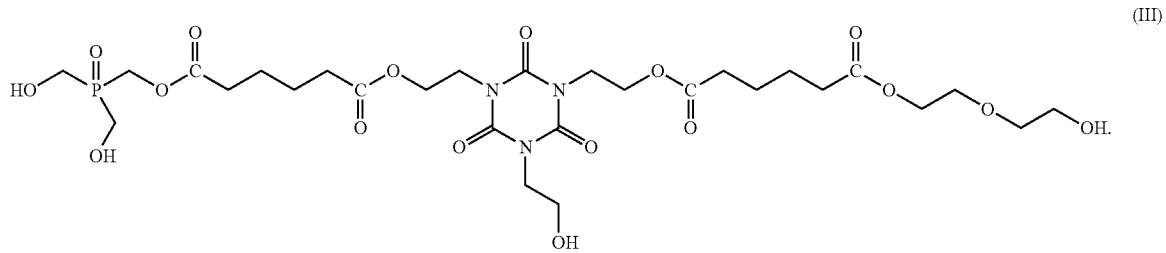 [SMILES: O=C(CCCCC(=O)OCCn1c(=O)n(CCO)c(=O)n(CCOC(=O)CCCCC(=O)OCP(=O)(CO)CO)c1=O)OCCOCCO]

14. A resin composition comprising:
(a) a polyfunctional isocyanate; and
(b) an isocyanate reactive composition comprising
  (b1) a polyfunctional polyol composition and a catalyst composition; and optionally
  (b2) a polyfunctional amine;
  wherein the polyfunctional polyol composition comprises the tris (hydroxymethyl) phosphine oxide based polyfunctional polyester polyol compound of claim 13.

* * * * *